United States Patent Office 3,544,594
Patented Dec. 1, 1970

3,544,594
1,3-DITHIETANE - 2,2,4,4 - TETRAACYL CHLORIDE AND THE CORRESPONDING ESTER AND AMIDE DERIVATIVES
Robert A. Grimm, Lakeville, Minn., assignor to Ashland Oil & Refining Company, Ashland, Ky., a corporation of Kentucky
No Drawing. Continuation-in-part of application Ser. No. 466,110, June 22, 1966. This application Mar. 19, 1968, Ser. No. 716,699
Int. Cl. C07d 69/00; C07c 153/05
U.S. Cl. 260—327                         7 Claims

ABSTRACT OF THE DISCLOSURE

Carbon suboxide is reacted with sulfur dichloride to yield 1,3-dithietane-2,2,4,4-tetraacyl chloride or reacted with a hydrocarbylsulfenyl chloride to yield a malonyl chloride. Said tetraacyl chloride or malonyl chloride can be hydrolyzed with an alcohol to form an ester or reacted with ammonia or a primary or secondary amine to form an amide. The tetraacyl chlorides of this invention as well as their ester and amide derivatives are useful as monomers in the preparation of polyesters for film-forming coatings. Additionally, said esters and amides possess utility as plasticizers for polyvinyl chloride.

---

This application is a continuation-in-part of my copending application Ser. No. 466,110, filed June 22, 1966, and now abandoned.

This invention relates to the preparation of 1,3-dithietane-2,2,4,4-tetraacyl chloride, and its corresponding ester and amide derivatives, as new compounds. In another aspect, it relates to the preparation of hydrocarbylthio malonyl chlorides, and their corresponding ester and amide derivatives, as new compounds.

Briefly, I have discovered a new class of compounds having the General Formulas A and B:

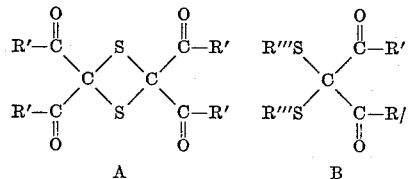

where R' is a member selected from the group consisting of chlorine, OR", and N(R")$_2$, where R" is an alkyl, alkenyl, or substituted alkyl ester (such as ester substituted alkyl), R" generally having 1 to 20 carbon atoms, and R'" is a hydrocarbyl radical, generally having 1 to 18 carbon atoms, such as alkyl, cycloalkyl, aryl, and combinations thereof such as alkaryl, aralkyl, alkylcycloalkyl, cycloalkylalkyl, arylcycloalkyl, cycloalkylaryl, and the like. R'" is preferably an alkyl or aryl. R'" can have various functional groups or substituents, such as chloro and ester groups, though I prefer that R'" be an unsubstituted hydrocarbyl radical, that is, that it consist only of hydrogen and carbon atoms.

The acyl chloride of General Formula A (i.e., where R' is chlorine) is prepared according to this invention by reacting stoichiometric amounts of sulfur dichloride and carbon suboxide as illustrated by the following reaction:

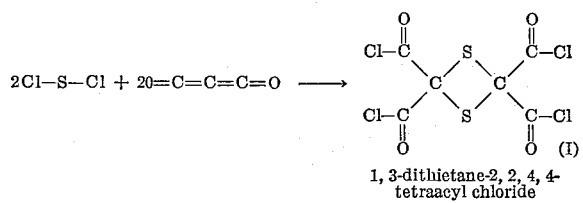

1, 3-dithietane-2, 2, 4, 4-tetraacyl chloride

The carbon suboxide reactant can be prepared by a variety of methods, though I prefer to prepare it by pyrolysing diacetyl tartaric anhydride, condensing the resulting vaporous carbon suboxide, and maintaining it in its liquid state prior to use by keeping it below its boiling point (7° C.). The liquid carbon suboxide can then be mixed with a solution of the sulfur dichloride in an inert solvent such as ethyl ether, carbon tetrachloride, toluene, chloroform, xylene, cyclohexane, or one of the Freons. The mixing of the reactants together is preferably carried out at a temperature in the range of —80 to 0° C., preferably —20 to 0° C., by distilling the carbon suboxide into the sulfur dichloride solution. The reaction vessel is then closed to prevent escape of the carbon suboxide. The ensuing reaction is preferably maintained at a temperature in the range of —25° C. to 7° C. As the reaction proceeds, and while it is maintained at said low temperatures, 1,3-dithietane-2,2,4,4-tetraacyl chloride forms and generally precipitates as orange crystals, the reaction or precipitation generally being complete in 1 to 5 hours. Recovery of the product can be accomplished by several known recovery techniques, for example, by filtering off the crystals and washing them with further solvent, such as hexane, and then drying the crystal product. If the product is soluble in the solvent, the solution can be used as is to prepare further derivatives or else the solvent can be removed and the solid product recovered.

The malonyl chlorides of the compounds having General Formula B can be prepared by reacting stoichiometric amounts of a hydrocarbylsulfenyl chloride, $$R'''\text{—S—Cl}$$

where R'" is as defined above, with carbon suboxide according to the general reaction:

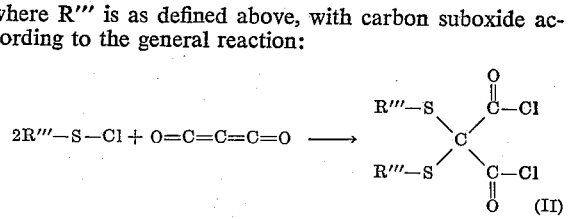

In other respects, Reaction II is carried out in the manner described above for Reaction I. The products of Reaction II can be similarly recovered and, where a single sulfenyl chloride reactant is used rather than a mixture of different sulfenyl chlorides, the products are named 2,2-bis(hydrocarbylthio)-malonyl chlorides. Where a mixture of different sulfenyl chlorides are used, the products are named as 2-hydrocarbylthio-2-hydrocarbylthiomalonyl chlorides.

Representative hydrocarbylsulfenyl chlorides which can be used in carrying out Reaction II representatively include methanesulfenyl chloride, ethanesulfenyl chloride, propanesulfenyl chloride, hexanesulfenyl chloride, propanesulfenyl chloride, hexanesulfenyl chloride, octanesulfenyl chloride, decanesulfenyl chloride, dodecanesulfenyl chloride, tridecanesulfenyl chloride, tetradecanesulfenyl chloride, hexadecanesulfenyl chloride, octadecanesulfenyl chloride, 2-methlyl-2-propanesulfenyl chloride, chloromethanesulfenyl chloride, carboethoxymethanesulfenyl chloride, cyclohexanesulfenyl chloride, 1-chlorocyclohexanesulfenyl chloride, para-toluenesulfenyl chloride, alpha-toluenesulfenyl chloride, 2-methylcyclohexanesulfenyl chloride, cyclohexylmethanesulfenyl chloride, 4-phenylcyclohexanesulfenyl chloride, 4-cyclohexylbenzenesulfenyl chloride, and the like, including mixtures thereof.

Representative 2,2-bis(hydrocarbylthio) malonyl chlorides which can be prepared according to this invention include 2,2-bis(methylthio)malonyl chloride, 2,2-bis(ethylthio)malonyl chloride, 2,2-bis(octadecylthio) malonyl chloride, 2,2-bis(2-methyl-2-propylthio) malonyl chloride, 2,2-bis(chloromethylthio) malonyl chloride, 2,2-bis(carboethoxymethylthio) malonyl chloride, 2,2-bis(cyclohexylthio) malonyl chloride, 2,2-bis(1-chlorocyclohexylthio) malonyl chloride, 2,2-bis(paratolylthio) malonyl chloride, 2,2-bis(alpha-tolylthio) malonyl chloride, 2,2-bis(2-methylcyclohexylthio) malonyl chloride, 2,2-bis(cyclohexylmethylthio) malonyl chloride, 2,2-bis(4-phenylcyclohexylthio) malonyl chloride, 2,2-bis(4-cyclohexylphenylthio) malonyl chloride, 2-phenylthio-2-methylthiomalonyl chloride, 2-para-tolylthio-2-octadecylthiomalonyl chloride, 2-chloromethylthio - 2-carboethoxymethylthiomalonyl chloride and the like.

The chlorides of the compounds falling within the scope of General Formulas A and B, i.e., the illustrated reaction products of Reactions I and II, respectively, can be used to prepare the corresponding ester and amide derivatives. In forming the ester derivatives, the chloride precursor is hydrolyzed with a mono- or polyhydric alcohol, or ester substituted alcohols, particularly those of the latter derived from the higher fatty acids. Representative alcohols which can be used include ethyl alcohol, butyl alcohol, octyl alcohol, octadecyl alcohol, 9-octadecenyl alcohol, 1,3-propanediol, ethyl 9-hydroxystearate, ethyl 12-hydroxystearate, methyl 18-hydroxystearate, 1,12-octadecanediol, pentaerythritol, and the like, including mixtures thereof. Representatively, esters of the chlorides of General Formula A include di-12(ethylsteareate)dimethyl 1,3-dithietane - 2,2,4,4-tetracarboxylate, di-18-(ethylstearate)diethyl 1,3-dithietane-2,2,4,4-tetracarboxylate, diethyl dioctadecyl 1,3-dithietane-2,2,4,4-tetracarboxylate, tetraethyl 1,3-diethietane - 2,2,4,4-tetracarboxylate, tetrabutyl 1,3-dithietane-2,2,4,4-tetracarboxylate, tetraoctadecyl 1,3-dithietane - 2,2,4,4-tetracarboxylate, tetra-(9-octadecenyl) 1,3-dithietane - 2,2,4,4-tetracarboxylate, tetra-12-(ethylstearate) 1,3-dithietane - 2,2,4,4-tetracarboxylate, and the like, and the polyesters resulting from reaction with 1,3-propanediol, octadecanediol and pentaerythritol. The simple tetra-esters (i.e., those resulting from hydrolysis of the chloride precursor with a mono-hydric alcohol) are useful as plasticizers. Representative esters of the chlorides of the compounds of General Formula B include diethyl 2,2-bis(phenylthio) malonate, dibutyl 2,2-bis(chloromethylthio) malonate, cyclohexyl octadecyl 2,2-bis(chloromethylthio) malonate, di-12-(ethylstearate) 2,2-bis (alpha-tolylthio) malonate, dioctadecyl 2,2-bis(methylthio) malonate, dimethyl 2,2-bis(methylthio) malonate, 1,3-propanediol, and polymers resulting from reaction with octadecanediol and pentaerythritol.

The esters of these acid chlorides of General Formulas A and B, e.g., esters of methyl through eicosyl alcohols and unsaturated and ester substituted alcohols as well as the amides of the corresponding amines of said alcohols, are useful as plasticizers for poly(vinyl chloride). Addition of these compounds, e.g., tetradodecyl 1,3-dithietane-2,2,4,4-tetracarboxylate, to poly(vinyl chloride) in a conventional manner at a concentration of from 3–15 p.p.h. and milling results in a plasticized poly(vinyl chloride).

If a mixture of alcohols is used to prepare the ester derivatives of this invention, such derivatives will have different ester groups, i.e., different OR″ groups will be attached to the carbon atoms of the various carbonyl groups of the compounds of General Formulas A and B. If the alcohols used to prepare the ester derivatives are liquids, the esters can be made by simple addition of the alcohol to the acyl chloride. However, if the alcohols are solids, inert solvents such as chloroform, benzene, toluene, etc., should be used to dissolve such solids. Reaction of the chlorides of the compounds of General Formulas A and B with the alcohols can be carried out at room temperature (25° C.), although temperatures in the broad range of −10° to 60° C. are applicable. At room temperature, the reaction is almost instaneous and no catalyst is necessary.

The amide derivatives of the chlorides of the compounds of General Formulas A and B can be prepared by reacting the chloride precursor with ammonia or primary or secondary amines. Amines which can be used for this purpose representatively include ammonia, methylamine, dimethylamine, ethylamine, diethylamine, octylamine, tetradecylamine, octadecylamine, 9-octadecenylamine, ethyl 9-aminostearate, aniline, and the like, including mixtures thereof. Representative amides of the chlorides of general formula A include 1,3-dithietane - 2,2,4,4-tetracarboxamide, tetra-(N-ethyl) 1,3-dithietane-2,2,4,4-tetracarboxamide, di-(N-ethyl)-di-(N-octadecyl) 1,3-dithietane-2,2,4,4-tetracarboxamide, tetra-(N-octadecyl) 1,3-dithietane-2,2,4,4-tetracarboxamide, tetra-(N-9-octadecenyl) 1,3-dithietane - 2,2,4,4-tetracarboxamide, tetra-9-(N-ethylstearate) 1,3-dithietane-2,2,4,4-tetracarboxamide, tri-(N-methyl)-N-octadecyl 1,3-dithietane - 2,2,4,4-tetracarboxamide, 1,3-dithietane - 2,2,4,4-tetracarboxanilide, di-(N-phenyl)-di-(N-octyl) - 2,2,4,4 - tetracarboxamide, tetra-(N,N-diethyl) 1,3-dithietane - 2,2,4,4 - tetracarboxamide, and the like. Representatives of the amides of General Formula B include 2,2-bis(phenylthio)malonamide, N-phenyl-N′-octadecyl malonamide, 2,2-bis(methylthio) malonanilide, di-N-ethyl 2,2-bis(benzylthio) malonamide, di-N,N-diethyl 2,2-bis(benzylthio) malonamide, and the like.

The amide derivatives of the acyl chlorides of the compounds of General Formulas A and B can be prepared by dissolving ammonia or the primary or secondary amine in an inert solvent such as cyclohexane, ether, hexane, toluene, etc., and cooling the solution to a temperature, for example, in the range of −60° C. to 0° C., preferably about −25° C. (Temperatures above 0° C. will result in decomposition and should be avoided.) The acyl chlorides are then added to the solution of ammonia or amine with stirring, the acyl chloride reactant being preferably dissolved in one of said inert solvents. The preparation of these amides can be accomplished without the use of catalysts.

The acyl chlorides of this invention, as well as their ester and amide derivatives, are useful as monomers in the preparation of polyesters for film-forming coatings, and can also be used as chemical intermediates in organic syntheses. For example, reaction of one mole of the tetraacyl chloride with one mole of a dihydroxy alcohol such as 1,10-decanediol or 1,9(10)octadecanediol and subsequent reaction of this product with two moles of a monohydroxy alcohol or amine such as ethylhexanol or di-n-butylamine gives a polymer from which films can be cast by ordinary techniques. The 1,3-dithietane-2,2,4,4-tetraacyl chloride and malonyl chlorides are useful as crosslinking agents for polyester resins. For example, hydroxyl-containing polyester resins such as those obtained from triglycerides (e.g., linseed oil), glycerol and diacid anhydrides (e.g., phthalic anhydride), upon mixing with the aforementioned acyl chlorides in amounts sufficient to react with remaining hydroxyl groups of said polyester resin, and immediate application of the mixture of polyester resin and acid chloride to a surface results in a tough, translucent protective film.

The following examples further illustrate the objects and advantages of this invention, but it should be understood that the particular reactants, conditions of the reaction, and other details of these examples should not be construed to unduly limit this invention.

EXAMPLE I

A solution of freshly distilled sulfur dichloride (0.835 mole) in ethyl ether (10 moles) was mixed with a solution of carbon suboxide (0.82 mole) in ether (20 moles) at 0° C. The reaction flask was tightly stoppered and stored in a freezer at −25° C. until the resulting orange prisms stopped growing, the crystals were filtered from the reaction mixture, washed with ether, and stored under ether overnight. The first crop of crystals had a pungent odor and a melting point of 79–82° C. This crystal product was characterized as 1,3-dithietane-2,2,4,4-tetraacyl chloride by making the corresponding ethyl ester and diethyl amine derivatives, as described in the following examples.

EXAMPLE II

One and two-tenths moles of the crystal product of Example I were mixed with about 6 moles of ethyl alcohol. A vigorous reaction ensued forming an odorless, yellow solution. A small excess of the ethyl alcohol was removed from the reaction product, causing the oil to crystallize. The crystal product was decolorized with activated charcoal and upon recrystallizing it with hexane was found to have a melting point of 59.5 to 60° C. Elemental analysis, infrared spectrum analysis, nuclear magnetic resonance and molecular weight determination established the product as tetraethyl-1,3-dithietane-2,2,4,4-tetracarboxylate.

EXAMPLE III

Six-tenths mole of the crystal product of Example I was dissolved in ether at room temperature and 5 moles of diethyl amine were added to the solution until it became alkaline. The resulting precipitate that was formed was filtered and found to be diethyl ammonium chloride. The ether was evaporated from the filtrate, producing a brown oil that was triturated with hexane. The remaining material was then recrystallized from hexane-acetone to give colorless prisms, M.P. 194.5–195° C., which was characterized by infrared spectrum analysis as N,N-diethyl-1,3-dithietane-2,2,4,4-tetracarboxamide.

Various modifications and alterations of this invention will become apparent to those skilled in the art without departing from the scope and spirit of this invention, and it should be understood that this invention is not to be unduly limited to that set forth herein for illustrative purposes.

What is claimed is:
1. A compound having the general formula

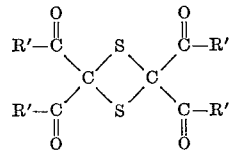

where R' is a member selected from the group consisting of chlorine, OR", and N(R")$_2$, where R" is a C$_1$–C$_{20}$ alkyl or C$_2$–C$_{20}$ alkenyl radical.

2. A compound according to claim 1 where R' is chlorine.

3. A compound according to claim 1 where R' is OR", and R" is a C$_1$–C$_{20}$ alkyl or C$_2$–C$_{20}$ alkenyl.

4. A compound according to claim 1 where R' is N(R")$_2$, and R" is a C$_1$–C$_{20}$ alkyl or C$_2$–C$_{20}$ alkenyl.

5. A compound according to claim 3 where R' is —OCH$_2$CH$_3$.

6. A compound according to claim 4 where R' is —N(CH$_2$CH$_3$)$_2$.

7. A process of preparing the compound of claim 2 which comprises reacting at a temperature between about —25° C. and 7° C. carbon suboxide with sulfur dichloride and recovering the resultant product.

References Cited
UNITED STATES PATENTS 3,113,936  12/1963  Middleton _____ 260—79
3,117,977  1/1964  Middleton _____ 260—327

HENRY R. JILES, Primary Examiner

C. M. SHURKO, Assistant Examiner

U.S. Cl. X.R.

260—22, 30.2, 30.8, 75, 77, 481, 544, 561, 562